(12) United States Patent
Webster

(10) Patent No.: US 10,218,847 B1
(45) Date of Patent: Feb. 26, 2019

(54) APPLYING USER PREFERENCES, BEHAVIORAL PATTERNS AND/OR ENVIRONMENTAL FACTORS TO AN AUTOMATED CUSTOMER SUPPORT APPLICATION

(71) Applicant: West Corporation, Omaha, NE (US)

(72) Inventor: Craig A. Webster, Omaha, NE (US)

(73) Assignee: West Corporation, Omaha, NE (US)

(*) Notice: Subject to any disclaimer, the term of this patent is extended or adjusted under 35 U.S.C. 154(b) by 0 days.

(21) Appl. No.: 15/627,969

(22) Filed: Jun. 20, 2017

Related U.S. Application Data

(63) Continuation of application No. 15/383,867, filed on Dec. 19, 2016, now Pat. No. 9,686,409, which is a continuation of application No. 15/132,749, filed on Apr. 19, 2016, now Pat. No. 9,525,775, which is a continuation of application No. 14/262,962, filed on Apr. 28, 2014, now Pat. No. 9,319,524.

(51) Int. Cl.
*H04M 3/51* (2006.01)
*H04M 3/42* (2006.01)
*H04M 3/493* (2006.01)
*G06Q 30/00* (2012.01)
*G06F 17/30* (2006.01)

(52) U.S. Cl.
CPC .... *H04M 3/5166* (2013.01); *G06F 17/30749* (2013.01); *G06Q 30/016* (2013.01); *H04M 3/42068* (2013.01); *H04M 3/493* (2013.01); *H04M 3/4931* (2013.01); *H04M 2201/41* (2013.01); *H04M 2203/251* (2013.01); *H04M 2203/551* (2013.01); *H04M 2203/655* (2013.01); *H04M 2242/12* (2013.01)

(58) Field of Classification Search
CPC . G06Q 30/0269; H04M 3/493; H04M 3/5166
USPC ..... 379/72, 88.01, 88.18, 88.22, 93.01, 230, 379/88.11, 88.23, 93.13, 213.01, 218.01; 345/619; 370/328; 455/414.1; 704/270.1; 705/14.59, 319; 715/854
See application file for complete search history.

(56) References Cited

U.S. PATENT DOCUMENTS

| | | | | |
|---|---|---|---|---|
| 6,310,634 B1* | 10/2001 | Bodnar | ................ | G06F 3/0236 715/777 |
| 6,487,277 B2* | 11/2002 | Beyda | .................. | H04M 3/493 379/72 |
| 7,065,188 B1* | 6/2006 | Mei | ........................ | G10L 15/22 379/76 |
| 7,136,475 B1* | 11/2006 | Rogers | ................. | H04M 3/436 379/213.01 |
| 7,386,103 B1* | 6/2008 | Chahal | .................. | H04M 3/493 379/76 |
| 7,457,395 B2* | 11/2008 | Creamer | ............. | H04M 3/2227 379/88.01 |

(Continued)

*Primary Examiner* — Gerald Gauthier

(57) ABSTRACT

A method and apparatus of applying user profile information to a customized application are disclosed. One example method of operation may include receiving an inquiry message or call from a user device, identifying and authorizing the user from inquiry message information received from the inquiry message, retrieving a user profile comprising at least one user preference, applying the at least one user preference to a user call processing application, and transmitting menu options to the user device based on the applied at least user preference.

20 Claims, 9 Drawing Sheets

(56) References Cited

U.S. PATENT DOCUMENTS

| | | | | |
|---|---|---|---|---|
| 7,515,695 | B1* | 4/2009 | Chan | H04M 3/493 379/221.09 |
| 7,558,380 | B2* | 7/2009 | DiVenuta | G06Q 40/08 235/375 |
| 7,684,989 | B1* | 3/2010 | Collins | H04M 3/5166 704/270 |
| 7,907,149 | B1* | 3/2011 | Daum | G06Q 20/027 345/619 |
| 7,920,682 | B2* | 4/2011 | Byrne | H04M 1/645 345/473 |
| 8,000,454 | B1* | 8/2011 | Or-Bach | G06Q 20/10 379/100.14 |
| 8,131,271 | B2* | 3/2012 | Ramer | G06F 17/30749 455/414.1 |
| 8,923,489 | B1* | 12/2014 | Roux | H04L 67/306 379/72 |
| 8,929,517 | B1* | 1/2015 | Lavian | H04M 3/493 379/88.11 |
| 9,319,522 | B1* | 4/2016 | Webster | H04M 3/493 |
| 9,319,524 | B1* | 4/2016 | Webster | H04M 3/5166 |
| 9,485,356 | B1* | 11/2016 | Webster | H04M 3/493 |
| 9,525,775 | B1* | 12/2016 | Webster | H04M 3/5166 |
| 9,686,409 | B1* | 6/2017 | Webster | H04M 3/5166 |
| 9,741,056 | B1* | 8/2017 | Webster | H04M 3/493 |
| 9,860,377 | B1* | 1/2018 | Roux | H04M 3/493 |
| 2003/0081744 | A1* | 5/2003 | Gurfein | H04M 3/493 379/93.13 |
| 2003/0138095 | A1* | 7/2003 | Stroud | H04M 3/42153 379/230 |
| 2003/0147512 | A1* | 8/2003 | Abburi | H04M 1/7255 379/88.22 |
| 2004/0044567 | A1* | 3/2004 | Willis | A63F 13/12 705/14.59 |
| 2008/0019496 | A1* | 1/2008 | Taschereau | G06F 17/3087 379/218.01 |
| 2008/0304639 | A1* | 12/2008 | McDonough | H04M 3/493 379/93.01 |
| 2010/0145869 | A1* | 6/2010 | Brown | G06Q 10/10 705/319 |
| 2012/0140905 | A1* | 6/2012 | Awad | H04M 3/42068 379/88.01 |

* cited by examiner

APPLYING USER PREFERENCES, BEHAVIORAL PATTERNS AND/OR ENVIRONMENTAL FACTORS TO AN AUTOMATED CUSTOMER SUPPORT APPLICATION

CROSS-REFERENCE TO RELATED APPLICATIONS

This application is a continuation from U.S. patent application Ser. No. 15/383,867, filed Dec. 19, 2016, entitled "APPLYING USER PREFERENCES, BEHAVIORAL PATTERNS AND/OR ENVIRONMENTAL FACTORS TO AN AUTOMATED CUSTOMER SUPPORT APPLICATION", which is a continuation from U.S. patent application Ser. No. 15/132,749, filed Apr. 19, 2016, entitled "APPLYING USER PREFERENCES, BEHAVIORAL PATTERNS AND/OR ENVIRONMENTAL FACTORS TO AN AUTOMATED CUSTOMER SUPPORT APPLICATION", now issued U.S. Pat. No. 9,525,775, which is a continuation from U.S. patent application Ser. No. 14/262,962, filed Apr. 28, 2014, entitled "APPLYING USER PREFERENCES, BEHAVIORAL PATTERNS AND/OR ENVIRONMENTAL FACTORS TO AN AUTOMATED CUSTOMER SUPPORT APPLICATION", now issued U.S. Pat. No. 9,319,524, the entire contents of each of which are incorporated by reference herein in their entirety.

TECHNICAL FIELD

This invention relates to a customer support application that applies user preferences, and more particularly, to a customer support application that provides a customized call procedure based on user selected options and/or predefined user preferences that are identified and applied to an existing application model.

BACKGROUND

Conventionally, customer service phone calls, emails, chat and even the newer mobile phone applications are relatively the same for all customers. Certainly, user selections may dictate different results (e.g., "pay bill", "technical support", "add new services", "cancel service", etc.). However, user options are still presented to customers in a similar format from the automated call center or customer service support system. Customer support systems, such as interactive voice response (IVR) systems offer one or more options to the user(s) without any regard for the specific user and his or her preferences or requirements.

SUMMARY

One embodiment of the present application may include a method of applying user profile information to a customized application. The method may include receiving an inquiry message or call from a user device, identifying and authorizing the user from call information received from the inquiry message or call, retrieving a user profile comprising at least one user preference, applying the at least one user preference to a user call processing application, and transmitting menu options to the user device based on the applied at least user preference.

Another example embodiment of the present application may include an apparatus configured to apply user profile information to a customized application. The apparatus may include a receiver configured to receive an inquiry message or call from a user device and a processor configured to identify and authorize the user from call information received from the inquiry message or call, retrieve a user profile including at least one user preference, and apply the at least one user preference to a user call processing application. The apparatus may also include a transmitter configured to transmit menu options to the user device based on the applied at least one user preference.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the present application as claimed, but is merely representative of selected embodiments of the present application.

The features, structures, or characteristics of the present application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the present application may be applied to many types of network data, such as packet, frame, datagram, etc. For purposes of this present application, the term "message" also includes packet, frame, datagram, and any equivalents thereof. Furthermore, while certain types of messages and signaling are depicted in exemplary embodiments of the present application, the present application is not limited to a certain type of message, and the present application is not limited to a certain type of signaling.

Figure 1:
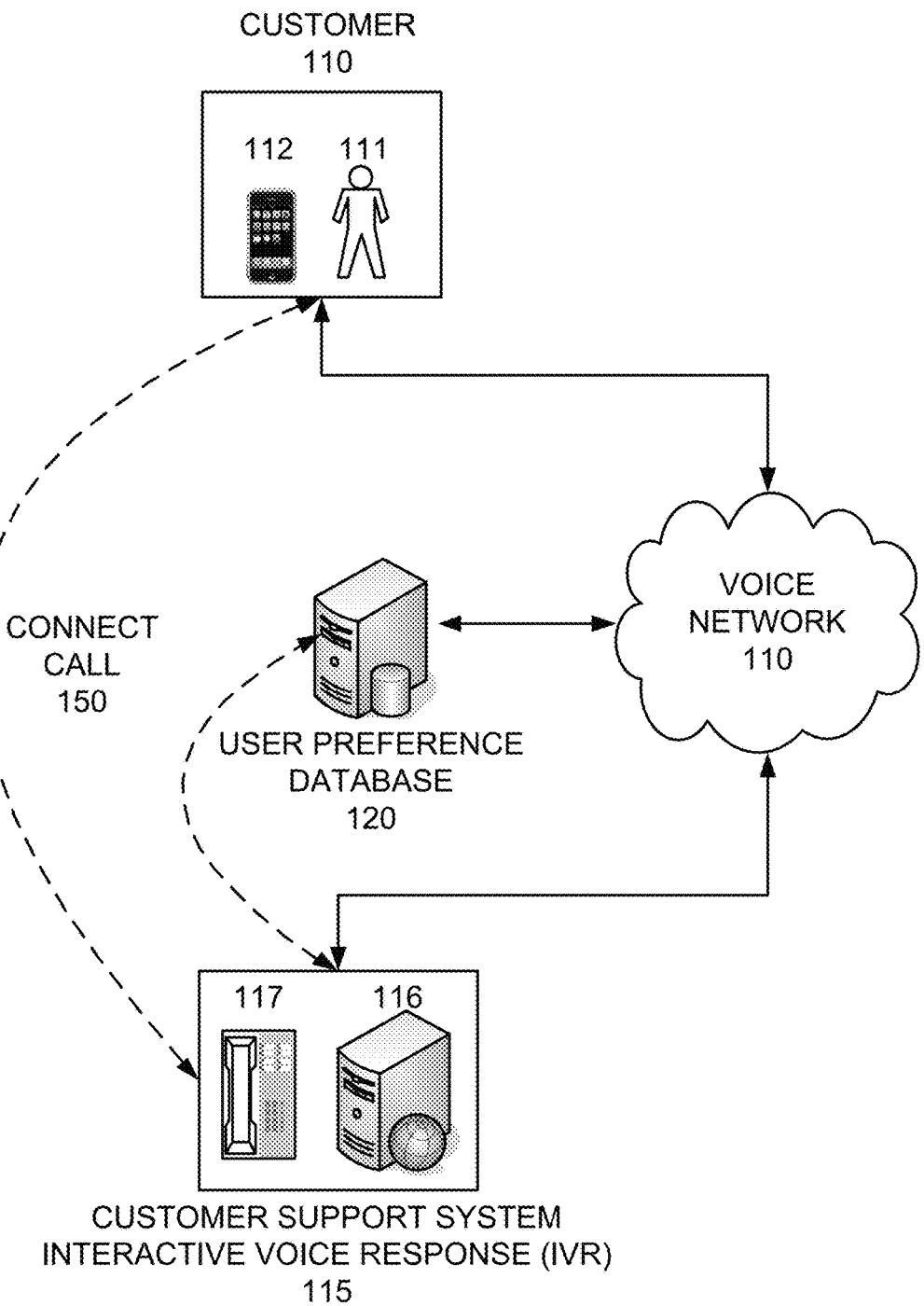
FIG. 1 illustrates an example communication network illustrating a customer communicating with a customer service support system.

FIG. 1 illustrates an example communication network 100 including a customer contacting a customer service support system according to example embodiments. Referring to FIG. 1, a customer 110 may include a user 111 operating a mobile device 112. For example, the mobile device may be a phone or similar mobile communication device 112 (i.e., smartphone) that is used to place a call to a business entity, such as a cable company to discuss a technical support matter. The call may be connected at operation 150 to a customer support system, such as an interactive voice response (IVR) system 115. A customer service representative may be operating a phone 117 across a voice network 110 (i.e., digital network (Internet), public switched telephone network (PSTN), private data network, etc.). The call may also be answered by an automated call processing system that provides automated user options via an IVR communication server 116.

In operation, the call may be placed by a dialed number on the user's smartphone 112. The call may be routed to a customer service support system 115 and connected to an IVR server 116. The call may be initiated by a dialed number of an automated call placing function associated with an installed application on the user's smartphone 112. Upon connecting the call, the IVR server 116 may identify and authenticate the user 111 as being a particular person with a corresponding profile (i.e., user account number, user name and address, user preferences, etc.). The profile may be a database record that is identified from a memory located in the user preference database 120. The user's smartphone device 112 may be identified as having a particular SIM card or other identifying feature that provides identification and authorization of the user 111 via the user's device 112. The user may also be identified by dialing or speaking his or her name and/or account number once the call has started and the user is prompted to supply identification information.

Upon receiving identification of the user, the call processing IVR server 116 may attempt to further authorize the user prior to accessing the user's account information and offering the user 111 an opportunity to make changes to his or her account. The user may be authorized and identified to access their own customer records to make changes to their account. The server 116 may retrieve the customer's known preferences for handling a customer call inquiry. Preferences may also be received from the user by a series of questions and corresponding user responses. For example, the user may have elected to have the outstanding balance be the first presented information to the user based on known user preferences. Certain users would only call into the IVR system to confirm their payment balance and make payments. The users that may have elected to have billing information as their top priority will be identified according to a confirmed menu option choice that is stored in the user's profile information. The profile information will be retrieved based on the identified user information and used as a flag or identifier by the call processing system as a trigger to provide an automated 'present balance due' parameter to the user without delay. For example, a user with a preferred billing preference would be identified/authorized and the IVR menu would offer the user an immediate response of "Hello Mr. John Smith, your current balance is $180.33, would you like to use your credit card ending in XYZZ to pay the bill at this time?"

Other user options may be identified as preferences for other services, for example, a user may have having frequent technical service problems and as a result, the user preferences may be updated automatically without user selection affirmation to provide a customer support representative the moment the user has logged into the system. Other users may be more interested in the latest content selections, or service upgrade packages. For example, the user may have previously spoken to a customer service representative or provided a response to the IVR system to be updated or added to a preference list of customers who can easily receive upgrade information as it becomes available. The user may call the customer service hotline at a later time and receive a recorded message upon being identified, such as "you're eligible for a free 3-month upgrade and no strings attached viewing package that includes access to the everyday sporting ticket for college basketball, never miss a game again!" In this case, the customer has either expressed interest in certain upgrade packages or sports viewing packages previously in prior calls and such information was retrieved from the database and used as the basis for a menu option trigger that presented the upgrade to the user before any other upgrade options.

Other examples of user preferences which may be manually setup and associated with the user account may include a language preference (e.g., English, Spanish, etc.), interaction with a female vs. a male agent, removal of pre-recorded instructions, removal of greetings and statements, such as "how are you today?" and "thank you", account balance being immediately presented to the caller, bypassing a main menu and having a default menu or sub-menu redirection to other menu options, such as ordering, upgrades, technical support, etc., hobby inquisition questions being presented to the caller, speech recognition vs. DTMF menu selection preferences being presented to the caller, etc.

The user preferences may be received and stored in the user preference database 120 and retrieved each time a user presented menu option or related function is initiated within the call processing system 100. The menu option may be presented to the user based on a prior examination of the retrieved user preference(s). The user may be identified, authorized and then his or her user preferences may be obtained during the course of the call or from pre-stored information associated with the user profile stored in the user preference database 120. The call may be an inquiry message, such as an email, a text message, a voice recording, a customer service ticket, an application generated message or a phone call, any of which invoke the customer service functions of the system described by the present disclosure.

Figure 2A:
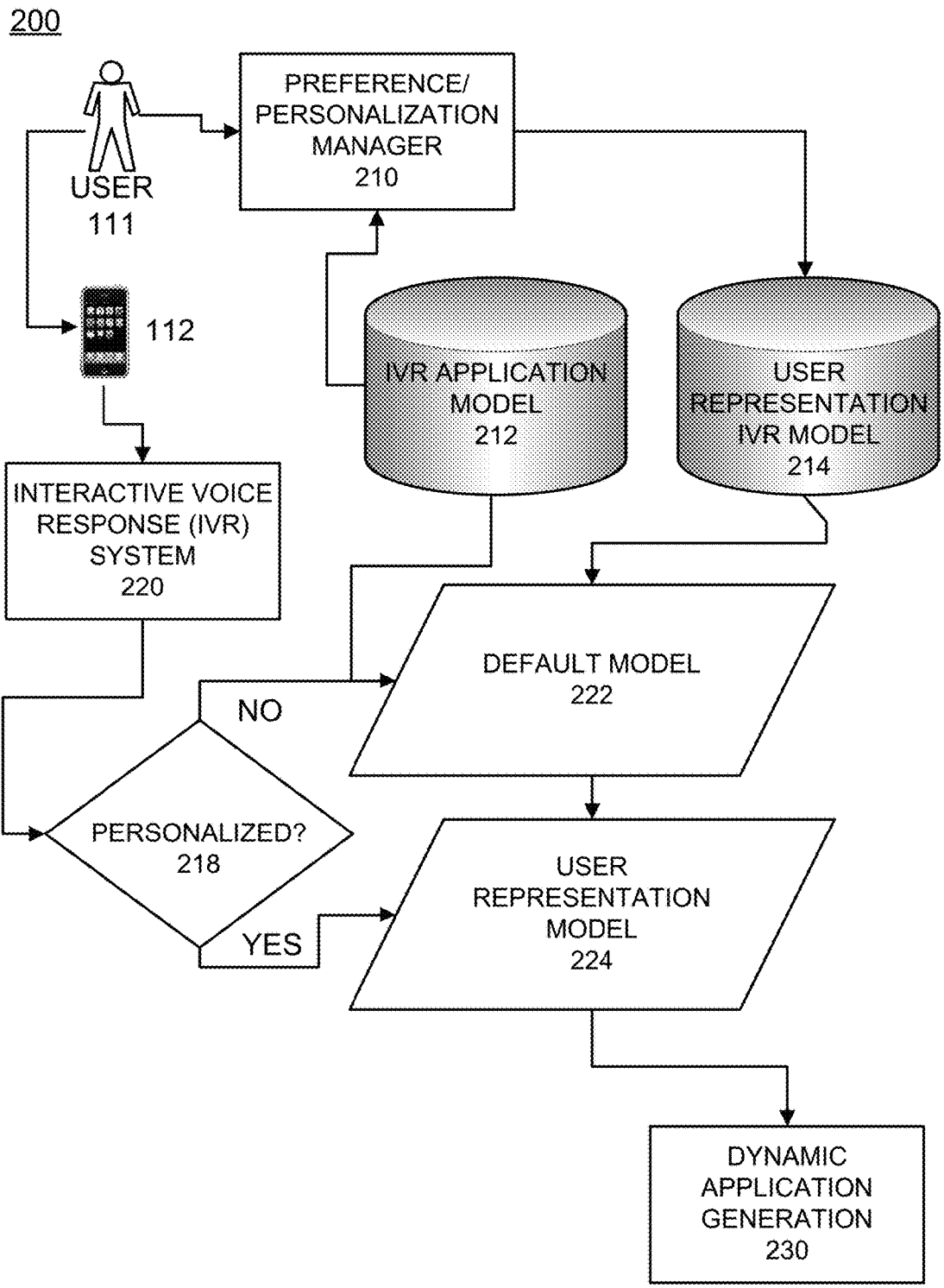
FIG. 2A illustrates an example system flow diagram of an application personalization operation applied to a customer service call.

FIG. 2A illustrates an example system flow diagram of an application personalization operation applied to a customer service call. Referring to FIG. 2A, the flow diagram 200 includes a customer 111 operating a mobile device 112. In operation, the customer may call, initiate an inquiry message generation and/or trigger a calling operating via an application on his or her mobile device 112. The mobile device 112 may establish communication with an interactive voice response system 220 via a mobile communication call (i.e., PSTN) or digital voice communication link (i.e., Internet). The call may be directed by an IVR application model 212 that provides a basic framework for different types of user preferences and user initiated selections which may be received, computed and associated with a user call for customization purposes.

During the initial call setup and IVR system user interaction with the customer's mobile device 212, the customer may elect certain options when prompted by the application personalization system. The user may offer certain information, such as (i.e., preferred order of menu options, IVR communication preferences, types of menu options presented, user priorities, etc.). A preference/personalization manager 210 may accept the user's input information and commands and generate a user profile that may be applied to the user or user's device for present and/or future call processing options transmitted to the user's mobile device 112.

As a result of receiving user input preferences and related information, a user representation IVR model 214 may organize the layout of options, questions, and messages to be transmitted to the user's mobile device upon connecting a call to the customer support center. The user may now place a new call or the concurrently placed call will now receive user specific menu options based on the retrieved user profile and customized user application template generated based on known user preferences. In operation, when a user call is received at the customer processing system, a determination is made as to whether the user has a known profile stored in the user representation IVR model databank 214. If so the personalized decision operation 218 will retrieve and apply the user model at function 224. If not, the system will apply the default model 222 and the dynamic application generation function 230 will proceed to handle the call logic accordingly.

According to one example embodiment, the user preferences may have a direct link, tag, pointer or other data identification mechanism to remove or add pre-recorded options to a presently conducted call. For example, if there are large number of possible menu options and scenarios that can potentially be presented to the caller, then most of those options may be paired with a particular pre-recorded voice/audio segment that is retrieved from memory and presented to the caller depending on the applied preferences and the present status of the call. For example, the caller may dial the customer access line via direct dialing or from an application on his or her smartphone and be connected with a voice recorded system that greets the caller and seeks to initiate an authorization and identification procedure based on the user provided audio, DTMF selections, or based on the telephone number associated with the caller's device.

Once a caller is identified/authorized, the caller may then be presented with a menu option that is based on one or more caller preferences. For instance, the user representation model 224 in FIG. 2A may present the caller with a particular menu option based on one or more retrieved user preferences stored in the user representation IVR model 214. For example, one user option selection menu option may be [initial preference] and may have a user selected preference of [pay bill] or [hear current balance], either of those options may invoke a particular audio segment, such as [audio "balance is:" {input 'dollar' variable for user X} "would you like to pay now"].

The pre-recorded segment may be identified as one particular audio segment that is paired to the user preference(s) and all other audio segments may be uninitiated or remain idle until one or more of those other audio segments are invoked for incorporation into the present call audio. The system may queue a number of different audio segments in a particular order dictated by the caller's preferences, which may include a priority. For example, the caller may set a first priority (1)—hear present 'balance', (2)—hear about new 'movies', 'sports', 'pay-per-view', (3) pay bill, etc.

According to one example, the user's voice may have been recorded as speaking certain preferences during a prior call or any earlier part of the same call (e.g., "college", "sports", "basketball", "football", "independent films", "horror movies", "children shows", etc.). Also, the user may have selected certain options via the dial pad that are linked to those above-noted example categories. In those cases, the information may be stored in a database as a content file linked to the user's account. When the user is authorized at the call center 115 the call may trigger an information retrieval operation that invokes user preference and interest identification procedures that retrieve the stored history information and obtain the most relevant information to present to the user in the form of an interactive voice response (IVR) system. Additional examples are provided in FIGS. 2B and 2C.

Figure 2B:
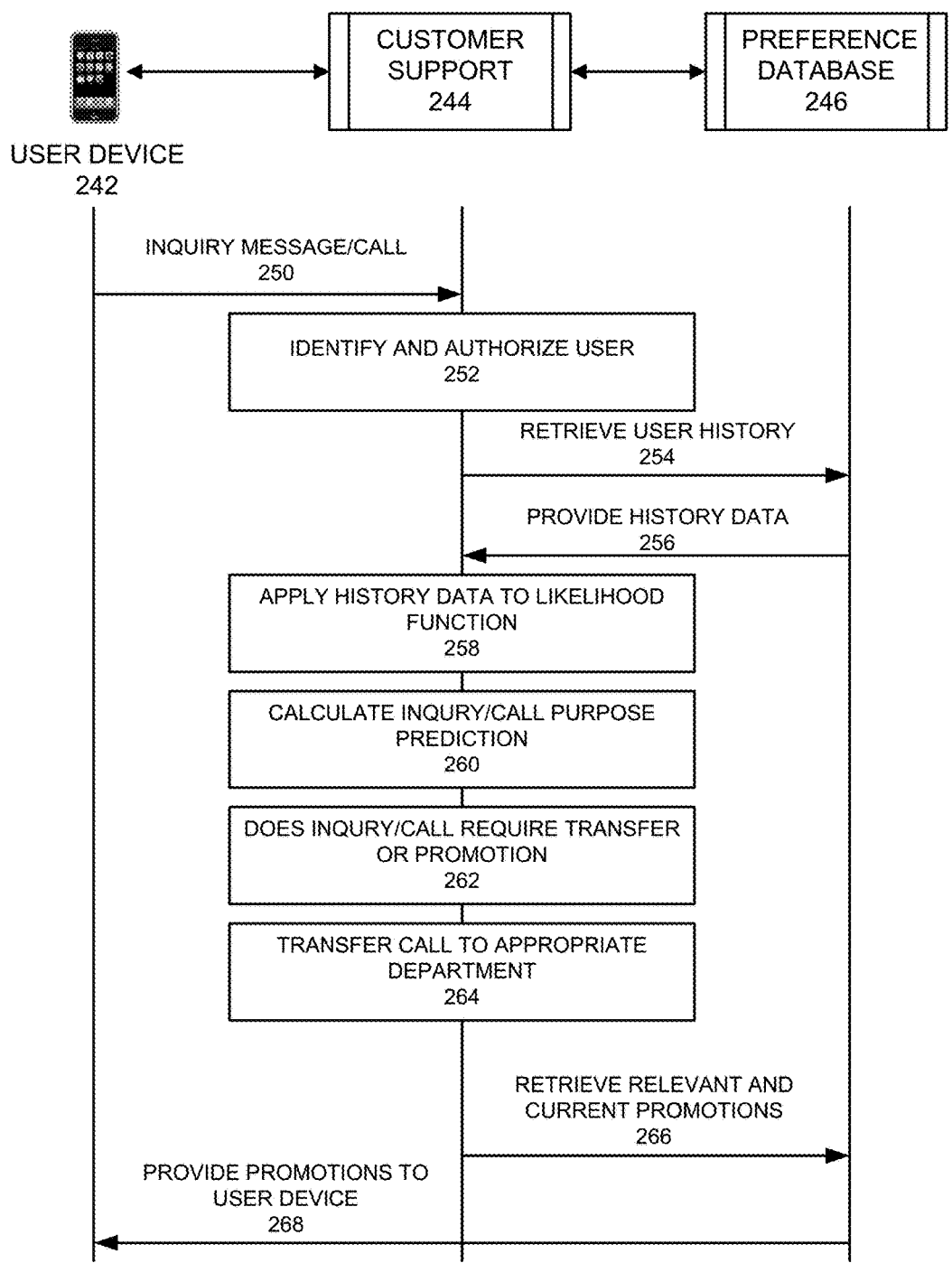
FIG. 2B illustrates an example system diagram of the communication signaling for providing a user device with predicted options based on prior user history.

FIG. 2B illustrates an example system diagram of the communication signaling diagram for providing a user device with predicted options based on prior user history. Referring to FIG. 2B, the communication diagram 240 includes three entities communicating among one another including the user device 242, the customer support call center or message processing server 244 and the preference database 246. The customer support entity 244 and the preference database 246 may be separate computer processing devices or may be the same device and may operate at a remote site and/or in the cloud computing space.

In the event that the user device transmits an inquiry, such as a request for service or assistance via a dialed call, an application message generation selection option on a smartphone application or via another option, such as SMS messaging, the message may be generated 250 and transmitted from the user device 242 to a customer support site 244. The message may be received and processed to identify and authorize 252 the user via the user's phone number, IP address, username, credentials, electronic certificate, etc. The user may be paired with a particular account and/or a set of user preferences stored in a database 246. The user account or preferences may be derived from previous calls or interactions received from the user and/or user selections, user subscription data, etc. The user history may be retrieved 254 and forwarded 256 to the customer support server 244.

In one example, the user may have called the customer support 244 and spoke words, such as "sports", "football", "movies", "high speed Internet", "affordable", "NFL", "NCAA", "Sweet Sixteen tournament", "European Soccer", "HBO", "movie packages", "late night entertainment", "foreign film", "children shows", "comedy", etc. Those words may be recorded, converted to text and stored in the user's profile. The user's profile may be retrieved when the user seeks access to the customer support service 244 and then preferences may be derived from the user's history information by performing a predictive analysis via a likelihood function 258. The basic operation of the likelihood function may identify a frequency of terms related to a broader subject and identify the user's preferences accordingly. For example, in the above example the spoken terms mostly relate to sports and if all such terms were spoken by a user, submitted in short message service (SMS) messages, were part of an email, etc., in one or more previous interactions and were recorded and stored in a data file, then the algorithm would likely extract a main preference to be [sports] and a secondary preference to be [movies] based on the various movie inquiries or [family] based on the wide range of categories. These preferences then can be queued in order depending on their relevance. The relevance may be based on an assigned weight value proportional to the number of times the words appear. For example, the sports related terms appear four times in the user's personal stored information. As a result, the weight for "sports" may be equal to four for that preference while the weight for "movies" may be equal to two, which is a lower weighted user preference. The user device may first be presented with a question related to sports, such as "do you want to hear about new sports packages for your online cable service?" or "are you satisfied with your sports packages?". Once the user denies the opportunity by selecting "no" or ignoring the message transmitted to the user device. In such a case, the second most weighted identified preference may then be presented to the user once the first option has been ignored after a certain amount of time.

During the user history identification procedure, the inquiry/call purpose may be identified via a predictive analysis that applied the likelihood function to a prediction operation that labels the user's inquiry as being associated with a particular purpose 260. The next determination may be to determine whether the inquiry message or call should be responded to with a promotional advertisement or whether the user needs immediate support 262. If the call requires support from a technical perspective or other service oriented issue, the call may be automatically forwarded to a call center agent in the corresponding department 264 that can respond with an automated all service, an automated text message service or even a live agent service. However, if the inquiry can be subjected to certain paid services or promotions, then the relevant promotions that are linked to the user preferences may be retrieved 266 and presented 268 in the order according to the user's preferences which are queued in a weighted order of relevance.

Figure 2C:
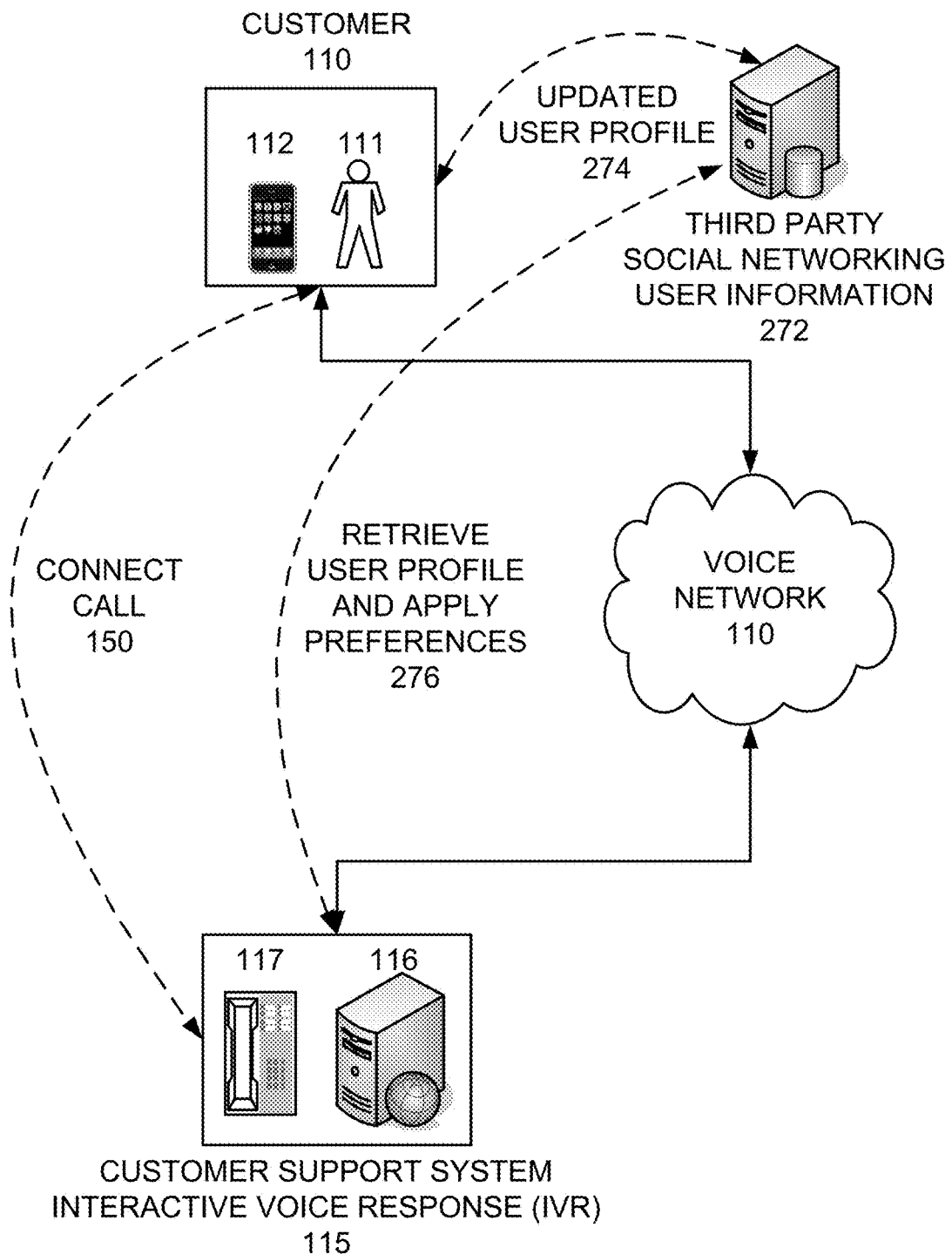
FIG. 2C illustrates an example network diagram of an alternative example of using a third party user profile to generate predictive responses to a user device.

FIG. 2C illustrates an example network diagram 270 of an alternative example of using a third party user profile to generate predictive responses to a user device. Referring to FIG. 2C, a customer 110 may include a user 111 operating a mobile device 112. For example, the mobile device may be a phone or similar mobile communication device 112 (i.e., smartphone) that is used to place a call to a business entity, such as a cable company to discuss a technical support matter. The call may be connected at operation 150 to a customer support system, such as an interactive voice response (IVR) system 115. A customer service representative may be operating a phone 117 across a voice network 110 (i.e., digital network (Internet), public switched telephone network (PSTN), private data network, etc.). The call may also be answered by an automated call processing system that provides automated user options via an IVR communication server 116.

In operation, the call may be placed by a dialed number on the user's smartphone 112. The call may be routed to a customer service support system 115 and connected to an IVR server 116. The call may be initiated by a dialed number of an automated call placing function associated with an installed application on the user's smartphone 112. Upon connecting the call, the IVR server 116 may identify and authenticate the user 111 as being a particular person with a corresponding profile (i.e., user account number, user name and address, user preferences, etc.). The profile of the user may be identified form a third party source 272. The user's smartphone device 112 may be identified as having a particular SIM card or other identifying feature that provides identification and authorization of the user 111 via the user's device 112. The user may also be identified by dialing or speaking his or her name and/or account number once the call has started and the user is prompted to supply identification information. The user may instead transmit a SMS message with certain terms, questions and concerns to the customer support system 116.

Upon receiving identification of the user, the call processing IVR server 116 may attempt to further authorize the user prior to accessing the user's account information and offering the user 111 an opportunity to make changes to his or her account. The user may be authorized and identified to access their own customer records to make changes to their account. The server 116 may retrieve the customer's known preferences for handling a customer call inquiry. Preferences may also be received from the user by a series of questions and corresponding user responses. In another example, the user preferences may be derived from information retrieved from the third party data source 272 and applied 276 to a message response algorithm that determines the user as having certain preferences or interests. For example, when the user device transmits an inquiry message to the customer support system 115, the user's social networking information (e.g., FACEBOOK®, TWITTER®, LINKEDIN®, etc.), and the information may be parsed to identify terms that match a predefined list of terms used to identify and create preferences associated with the user. For example, if the user has updated his or her profile 274 to include entries in a blog, profile information, posted links, photos, locations, places, sports, entertainment, special interests, charities, etc., then the user may be identified as having a special interest or preference that is associated with a service or product that can be offered by the customer support system 115. In such a case, the customer support system will retrieve the current advertisements and offers related to that preference(s) and provide those offers to the user via an IVR system, a text message, an email or other communication medium.

Figure 2D:
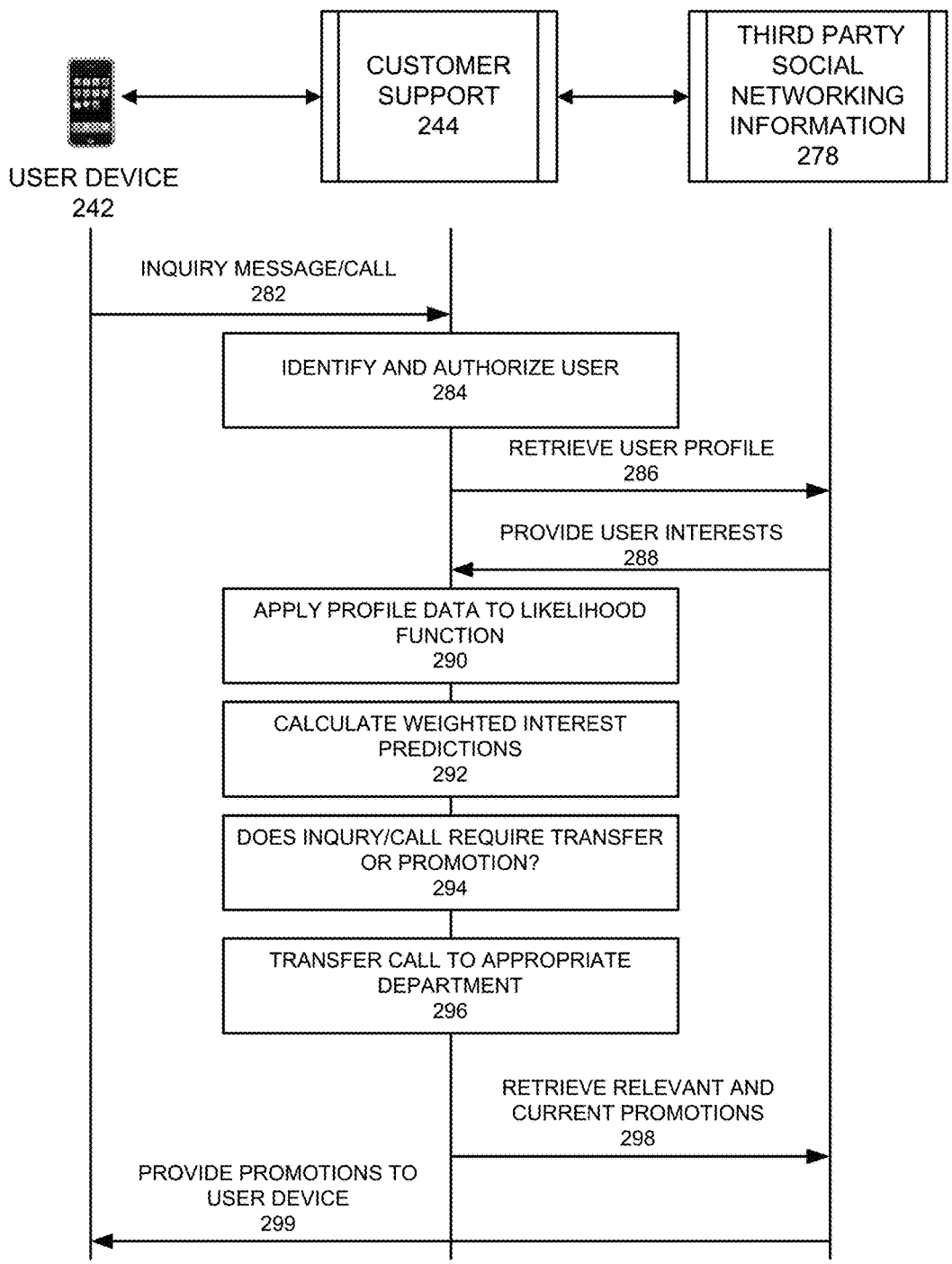
FIG. 2D illustrates an example system diagram of the communication signaling for providing a user device with predicted options based on third party user information.

FIG. 2D illustrates an example system diagram of the communication signaling diagram for providing a user device with predicted options based on third party user information. Referring to FIG. 2D, the communication diagram 280 includes three entities communicating among one another including the user device 242, the customer support call center or message processing server 244 and the third party social networking information source 278. The customer support entity 244 and the social networking information 278 may be separate computer processing devices or may be the same device and may operate at a remote site and/or in the cloud computing space.

In the event that the user device transmits an inquiry, such as a request for service or assistance via a dialed call, an application message generation selection option or via another option, the message may be generated 282 and transmitted from the user device 242 to a customer support site 244. The message may be received and processed to identify and authorize 284 the user via the user's phone number, IP address, username, credentials, electronic certificate, etc. The user may be paired with a particular account and/or a set of user preferences identified from the third party social networking site or database 278. The user account or preferences may be derived from previous calls or interactions received from the user and/or user selections, user subscription data, etc. The user profile may be retrieved 286 and forwarded 288 to the customer support server 244.

In one example, the user may have posted information on a blog, such as jokes and comments to certain friend accounts of the user, such as references to certain sports teams, comments about recent movies, political comments, vacation information, etc. Those words may be identified and stored in the user's profile account. The user's profile may be retrieved when the user seeks access to the customer support service 244 and then preferences may be derived from the user's social networking account information by performing a predictive analysis via a likelihood function 290. The basic operation of the likelihood function may identify a frequency of terms related to a broader subject, such as sports, politics, movies, etc., and identify the user's preferences accordingly. For example, in the above example the written terms may mostly relate to politics and all such terms may be written by a user, submitted in blog postings and/or were comments submitted electronically and on a server of the social networking platform. The algorithm of the likelihood function would then likely extract a main preference to be [politics] and a secondary preference to be [sports] based on the various information submitted from the user account. Those preferences then can be queued in order depending on their relevance. The relevance may be based on an assigned weight value proportional to the number of times the words appear for that category. For example, the politics related terms "gun control", "Obama", "Congress", etc., may appear four times in the user's personal stored information and the terms "LA Lakers" and "NFL" are two instances of sports terms, and may be required to appear over a recent window of time, such as 10, 20, 30, 60 days. As a result, the weight for "politics" may be equal to four for that preference while the weight for "sports" may be equal to two, which is a lower weighted user preference. The user device may first be presented with a question related to sports, such as "do you want to hear about new sports packages for your online cable service?" or "are you satisfied with your sports packages?". Once the user denies the opportunity by selecting "no" or ignoring the message transmitted to the user device. In such a case, the second most weighted identified preference may then be presented to the user once the first option has been ignored.

During the user history identification procedure, the inquiry/call purpose may be identified via a predictive analysis that applied the likelihood function to a prediction operation that labels the user's inquiry as being associated with a particular purpose 292. The next determination may be to determine whether the inquiry message or call should be responded to with a promotional advertisement or whether the user needs immediate support 294. If the call requires support from a technical perspective or other service oriented issue, the call may be automatically forwarded to a call center agent in the corresponding department 296 that can respond with an automated call service, an automated text message service or even a live agent service. However, if the inquiry can be subjected to certain paid services or promotions, then the relevant promotions that are linked to the user preferences may be retrieved 298 and presented 299 in the order according to the user's preferences which are queued in a weighted order of relevance.

Figure 3:
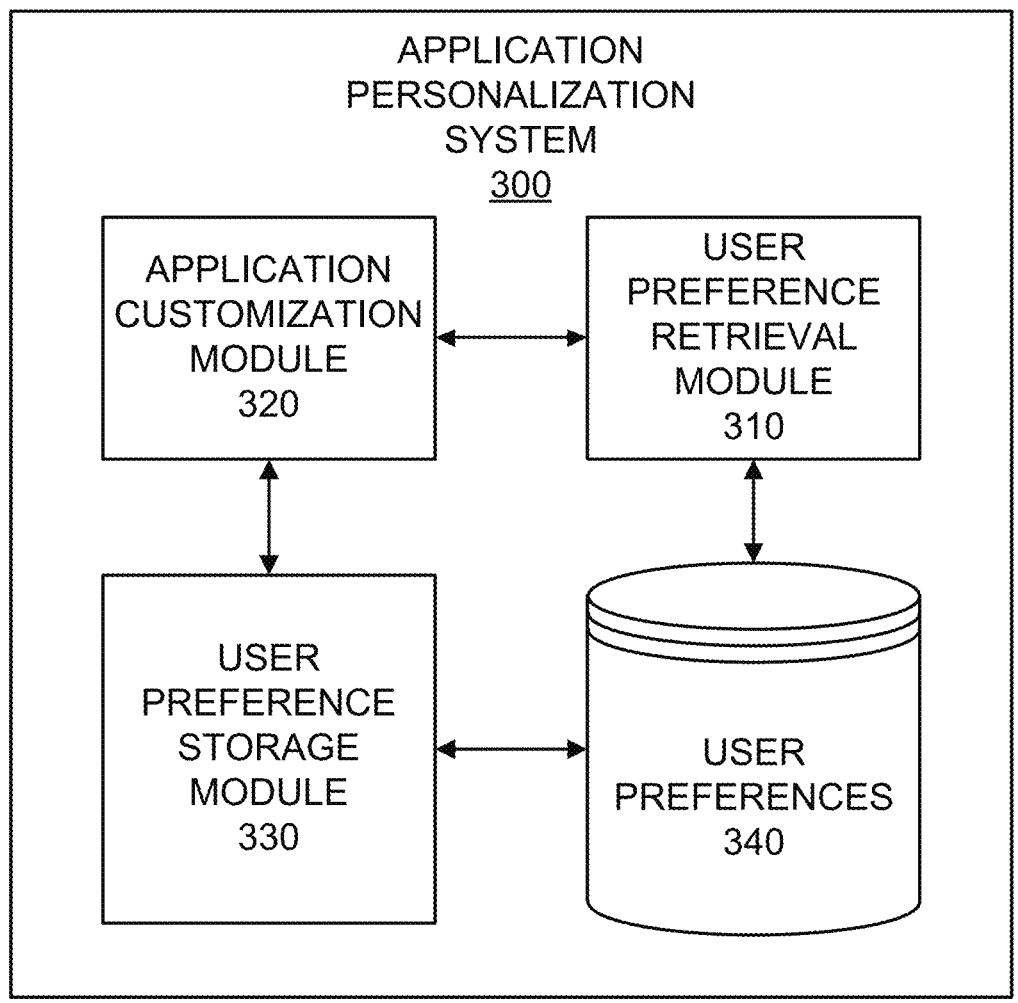
FIG. 3 illustrates an example application personalization system configuration according to example embodiments.

FIG. 3 illustrates an application personalization system 300 according to example embodiments. Referring to FIG. 3, the system 300 includes a set of user preferences stored under user profiles in a database 340. One example method of operation may include the system 300 applying user profile information to a customized application model. In operation, a user call is received from a user device at the system device or devices. The call information is received and the user is identified and authorized based on call information received from the call. The authorization information may include the user's telephone number, a pin number, a determined location, a sample of voice, etc.

Once the user is authorized, the user's profile is retrieved via the user preference retrieval module 310 and at least one user preference may be discovered from the user profile. The at least one user preference may be applied to a user call processing application via the application customization module 320. During the course of the call, the user preferences may be updated, accepted and modified based on the user input provided. Any changes or updates may be identified, saved and stored in memory by the user preference storage module 330.

The user preferences may be used as a basis for retrieving live call menu options and transmitting them to the user device based on the applied user preference(s). For example, the user preference may be matched to a pre-recorded audio segment stored in a database. The pre-recorded audio segment may be transmitted to a user device once the match is made. For example, a user preference, such as [billing information] may be matched to an audio segment that informs the user of a dollar amount of a current service bill. In another example, various different user preferences may be matched to a corresponding plurality of pre-recorded audio segments. Those audio segments may be queued into a call sequence, which is transmitted as a set of pre-recorded audio segments to the user device.

According to one example embodiment, phone calls which are dialed out of a user device a one option among many options to contact a customer support service center. In another example embodiment, the user may be accessing customer support via any communication channel/medium, such as email, live chat applications, website access, and mobile device applications. For example, transmitting menu options and/or automatically selecting a menu option for a user may be performed responsive to identifying the user and one or more of his or her preferences for processing customer support inquiries, or perhaps bypassing a menu and providing direct access to an automated customer support dialogue operation of the customer service processing system.

A user's preferred channel of communication may be identified via his or her preferences. In one example, a user may initiate a first medium of communication, via a text message, smartphone application, call, etc. As a result, the user call processing system may identify the inquiry from the user and apply one or more preferences to the result. In one example, the user may text an inquiry for an upgrade in service and receive an email with information regarding the upgrade since that is the user's preference to communicate with email. A user's preferred channel of communication may be a user preference in general.

Other factors may be applied to the inquiry processing, such as to determine option processing for a particular user. For example, a user's preferences, past behavior/selections, subscription account type, history of selections, demographic information, personal information, social networking profile or present behavior. If a user accesses an application and selects option "1" at the main menu every time in the past then the application may bypass that selection process in a subsequent call instead of making the user answer or listen to a menu and make a selection.

Other factors may be environmental. For example, if a user is a platinum customer, the application would look at agent availability and transfer the user directly to an agent if one is available or provide the user with their favorite menu choices. Other examples of environmental factors may include inclement weather, airport delays, boxing matches, playoff games, movie releases, overdue payments, prescription refill due date, etc. Custom "Strategy Engines" or rules engines may be applied for a number of clients for the purpose of segregating certain business logic from the main customer service application. One example may permit the clients to modify rule parameters to alter application behavior without having to go through an application development cycle. Such rules, when triggered, will alter the flow of the application to provide a more intelligent and personalized experience via a predictive intent of the use being identified.

Another example method of identifying a user inquiry and corresponding purpose for the inquiry provides receiving an inquiry from a user device at a customer call center server or comparable device and identifying and authorizing the user from the received inquiry. The next operation may include retrieving a user profile from memory that includes the history information based on previous interactions between the user device and the customer call center server (e.g., calls, messages, spoken dialogue, account information, etc.) and calculating a prediction as to a purpose for the inquiry. Then, transmitting a response to the inquiry based on the calculated prediction.

The inquiry may include at least one of a call and a short message service (SMS) message or other comparable smartphone communication option, such as email. Once the user history information is retrieved, the process may include identifying a plurality of terms associated with at least one predefined topic in the history information and calculating at least one weighted interest based on a number of terms associated with the at least one predefined topic. In another example, the process may include calculating a plurality of weighted interests, and storing the plurality of weighted interests in a queue in order of a magnitude of weights assigned to each of the weighted interests.

The method may also include retrieving the advertisement associated with a first weighted interest at a top position of the queue, and transmitting the at least one advertisement to the user device. The method may also provide waiting a predefined amount of time and receiving a negative response message from the user device responsive to the transmitted at least one advertisement, and transmitting at least one additional advertisement to the user device based on a second weighted interest in a next position of the queue.

In an alternative example, the user profile associated with the user device may be retrieved from a remote social networking database, and the at least one user preference may be identified from information associated with the user profile, and a reason for the inquiry may be predicted based on the at least one identified user preference included in the user's profile.

Figure 4A:
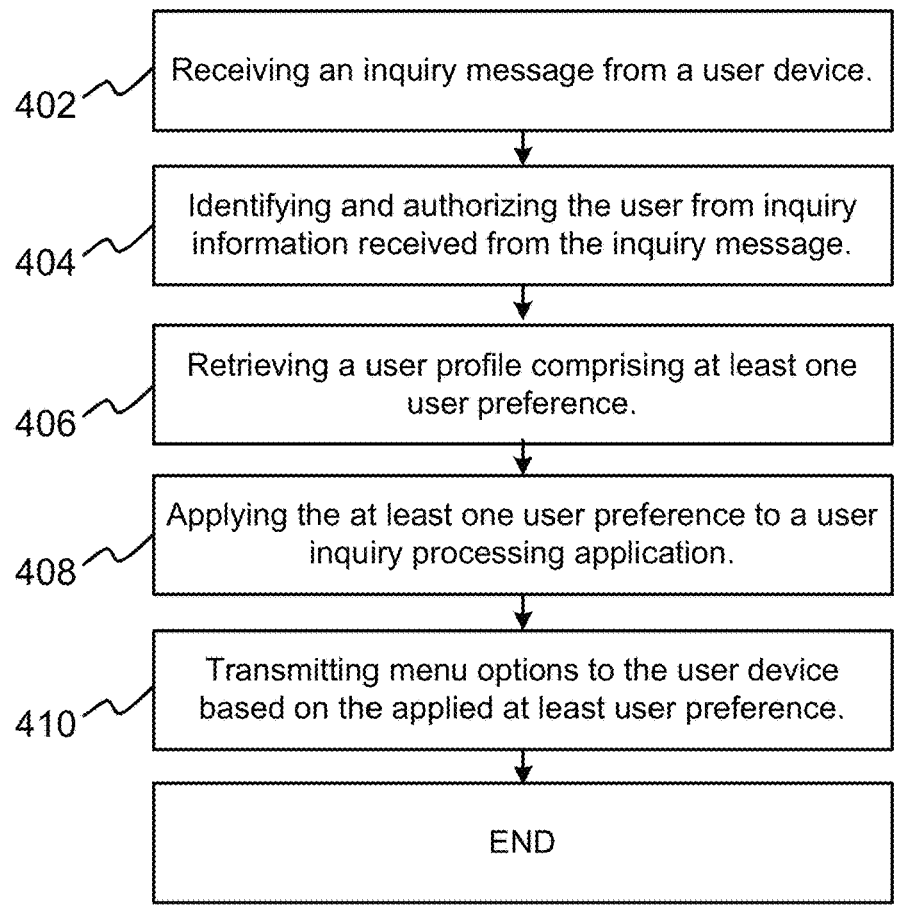
FIG. 4A illustrates an example flow diagram of an example method of operation according to example embodiments.

One example method of operation is illustrated in the flow diagram of FIG. 4A. Referring to FIG. 4A, the example method of operation 400 may include a method of applying user profile information to a customized application. The method may include receiving a call from a user device at operation 402. The method may also include identifying and authorizing the user from call information received from the call, at operation 404 and retrieving a user profile comprising at least one user preference, at operation 406. The method may further include applying the at least one user preference to a user call processing application at operation 408 and transmitting menu options to the user device based on the applied at least user preference at operation 410. Also, the operations may provide auto-selecting a menu option and/or bypassing the menu and transmitting the call into an automated customer support dialogue.

Figure 4B:
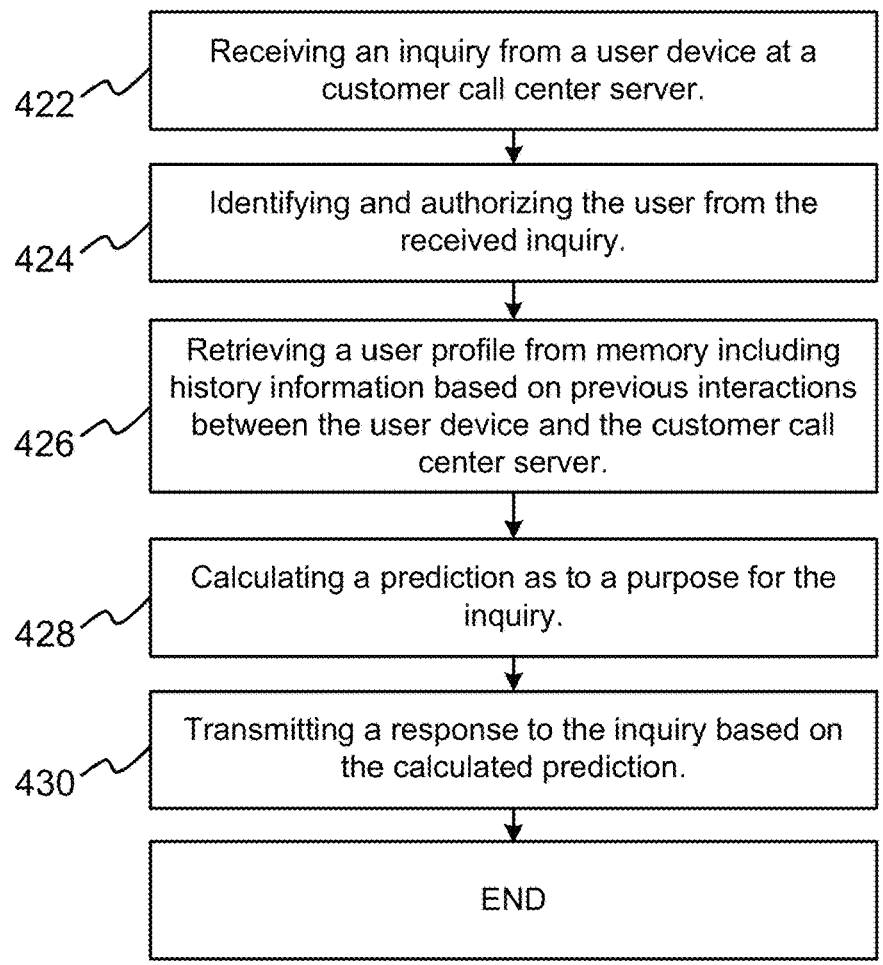
FIG. 4B illustrates another example flow diagram of an example method of operation according to example embodiments.

In another example flow diagram of FIG. 4B, a method of operation is illustrated. Referring to FIG. 4B, the flow diagram provides receiving an inquiry from a user device at a customer call center server and identifying and authorizing the user from the received inquiry at operation 422, retrieving a user profile from memory including history information based on previous interactions between the user device and the customer call center server at operation 424. The method also provides calculating a prediction as to a purpose for the inquiry at operation 426 and transmitting a response to the inquiry based on the calculated prediction at operation 428.

According to example embodiments, other factors may be applied to an inquiry message (e.g., email, text message, phone call, application message submission, etc.) submitted from a user device to determine a treatment for a particular user. For example, the user's past behavior/selections or the user's present behavior/selections. If a user accesses an application and selects option "1" at the main menu every time, perhaps the application will just make that selection for the user instead of requiring the user to listen to a menu and then make a selection. A predefined threshold may be required to actuate the automatic selection operation (e.g., "N" previous consecutive selections).

Other factors may be environmental. For example, if a user is a platinum customer via their profile, the application will look at agent availability and transfer the user directly to an advanced agent if one is available—otherwise, provide the user with their known, established and logged favorite menu choices. Other examples of environmental factors include inclement weather, airport delays, boxing matches, playoff games, movie releases, overdue payments, prescription refill due, etc.

Custom "strategy engines" or "rules engines" may be used for a number of clients for the purpose of segregating certain business logic from the main customer service application. One of the key functions is permitting clients to modify rule parameters to alter application behavior without having to go through an application development cycle. Such rules, when triggered, will alter the flow of the application to provide a more intelligent and personalized experience.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
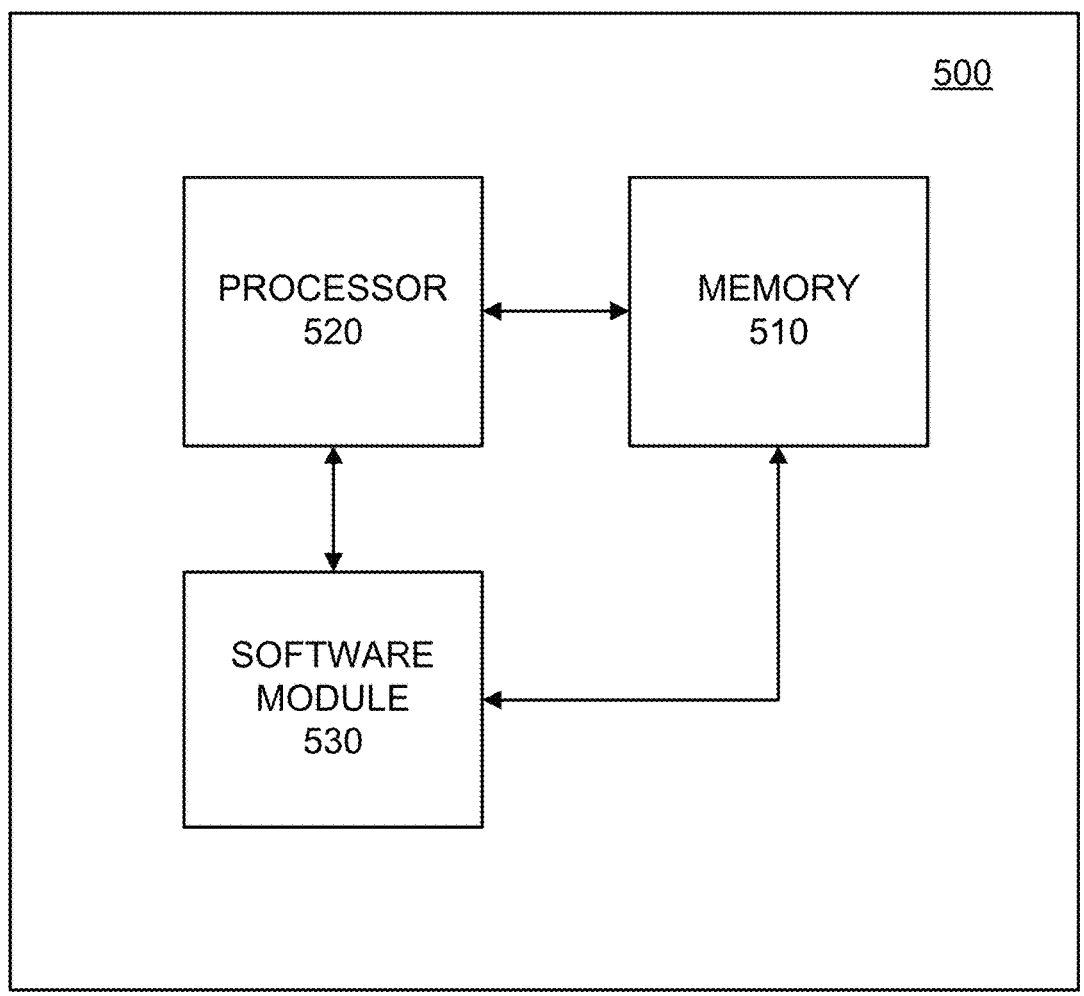
FIG. 5 illustrates a network entity that may include memory, software code and other computer processing hardware used to perform various operations according to example embodiments.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
at an interactive voice response (IVR) system:
matching at least one user preference to a pre-recorded audio segment;
transmitting the pre-recorded audio segment to a user device based on the matching of the at least one user preference;
transmitting menu options to the user device based on the transmitting of the pre-recorded audio segment and
invoking manual setup and association with an account related to the user device for interaction with one of a male agent and a female agent.

2. The method of claim 1, wherein an inquiry message further comprises a telephone number of the user device.

3. The method of claim 1, comprising retrieving a user profile comprising at least one user preference, wherein profile information of the user is stored in a remote database and is retrieved responsive to identifying the user of the user device.

4. The method of claim 1, wherein the at least one user preference comprises a plurality of user preferences.

5. The method of claim 4, further comprising:
matching each of the plurality of user preferences to a corresponding plurality of pre-recorded audio segments;

queuing the plurality of pre-recorded audio segments into a call sequence; and transmitting the call sequence as a set of pre-recorded audio segments to the user device.

6. The method of claim 1, wherein the at least one user preference comprises at least one of a language preference, a female or male agent preference, a removal of pre-recorded instructions preference, a removal of greeting statements preference, an account balance preference, a main menu bypass preference, a predefined menu preference, and a speech recognition or dual tone modulation frequency (DTMF) selection preference.

7. The method of claim 1, further comprising identifying the user from a sample of voice audio received from the inquiry message.

8. An apparatus, comprising:
a receiver configured to receive an inquiry message from a user device comprising a sample of voice audio provided from a user of the user device;
a processor at an interactive voice response (IVR) system configured to:
match at least one user preference to a pre-recorded audio segment; and
a transmitter configured to:
transmit menu options to a user device based on the at least one user preference;
transmit the pre-recorded audio segment to the user device based on the transmission of the menu options and
invoke manual setup and association with an account related to the user device for interaction with one of a male agent and a female agent.

9. The apparatus of claim 8, wherein the inquiry message further comprises a telephone number of the user device.

10. The apparatus of claim 8, wherein the processor is configured to retrieve a user profile comprising at least one user preference, wherein profile information of the user is stored in a remote database and is retrieved responsive to an identification of the user of the user device.

11. The apparatus of claim 8, wherein the at least one user preference comprises a plurality of user preferences.

12. The apparatus of claim 11, wherein the processor is further configured to:
match each of the plurality of user preferences to a corresponding plurality of pre-recorded audio segments,
queue the plurality of pre-recorded audio segments into a call sequence, and
wherein the transmitter is further configured to transmit the call sequence as a set of pre-recorded audio segments to the user device.

13. The apparatus of claim 8, wherein the at least one user preference comprises at least one of a language preference, a female or male agent preference, a removal of pre-recorded instructions preference, a removal of greet statements preference, an account balance preference, a main menu bypass preference, a predefined menu preference, and a speech recognition or dual tone modulation frequency (DTMF) selection preference.

14. The apparatus of claim 8, wherein the processor is further configured to identify the user from a sample of voice audio received from the inquiry message.

15. A non-transitory computer readable storage medium configured to store instructions that when executed cause a processor to perform:
at an interactive voice response (IVR) system:
matching at least one user preference to a pre-recorded audio segment;
transmitting the pre-recorded audio segment to a user device based on the matching of the at least one user preference;
transmitting menu options to the user device based on the transmitting of the pre-recorded audio segment and
invoking manual setup and association with an account related to the user device for interaction with one of a male agent and a female agent.

16. The non-transitory computer readable storage medium of claim 15, wherein the inquiry message further comprises a telephone number of the user device.

17. The non-transitory computer readable storage medium of claim 15, wherein the processor is further configured to perform retrieving a user profile comprising at least one user preference, wherein profile information of the user is stored in a remote database and is retrieved responsive to identifying the user of the user device.

18. The non-transitory computer readable storage medium of claim 15, wherein the at least one user preference comprises a plurality of user preferences.

19. The non-transitory computer readable storage medium of claim 18, wherein the processor is further configured to perform:
matching each of the plurality of user preferences to a corresponding plurality of pre-recorded audio segments;
queuing the plurality of pre-recorded audio segments into a call sequence; and
transmitting the call sequence as a set of pre-recorded audio segments to the user device, and
wherein the at least one user preference comprises at least one of a language preference, a female or male agent preference, a removal of pre-recorded instructions preference, a removal of greeting statements preference, an account balance preference, a main menu bypass preference, a predefined menu preference, and a speech recognition or dual tone modulation frequency (DTMF) selection preference.

20. The non-transitory computer readable storage medium of claim 15, wherein the processor is further configured to perform identifying the user from a sample of voice audio received from the inquiry message.

* * * * *